United States Patent
Komitov et al.

(10) Patent No.: US 7,907,236 B2
(45) Date of Patent: Mar. 15, 2011

(54) LIQUID CRYSTAL DEVICE FOR GENERATION AND FAST SWITCHING OF HIGH CONTRAST IMAGES

(76) Inventors: Lachezar Komitov, Göteborg (SE); Nils Olsson, Göteborg (SE); Bertil Helgee, Västra Frölunda (SE)

( * ) Notice: Subject to any disclaimer, the term of this patent is extended or adjusted under 35 U.S.C. 154(b) by 424 days.

(21) Appl. No.: 11/892,399

(22) Filed: Aug. 22, 2007

(65) Prior Publication Data
US 2008/0049175 A1 Feb. 28, 2008

Related U.S. Application Data

(60) Provisional application No. 60/840,014, filed on Aug. 25, 2006.

(51) Int. Cl.
*G02F 1/1335* (2006.01)
(52) U.S. Cl. ......................................................... 349/96
(58) Field of Classification Search ....................... 349/96
See application file for complete search history.

(56) References Cited

U.S. PATENT DOCUMENTS

2002/0075445 A1* 6/2002 Dabrowski et al. ........... 349/174

OTHER PUBLICATIONS

Nils Olsson, Bertil Helgee, Gunnar Andersson, and Lachezar Komitov, A new series of silaxane liquid crystalline dimers exhibiting the antiferroelectric phase, Jun. 27, 2005, Taylor and Francis, vol. 32, 1139-1150.*

K. D'Havé et al. "Antiferroelectric Liquid Crystals with 45° Tilt—A New Class of Promising Electro-Optic Materials", *Ferroelectrics*, 2000, vol. 244, pp. 115-128, Gent, Belgium.

Atsuo Fukuda, et al. "Antiferroelectric Chiral Smectic Liquid Crystals", *J. Mater. Chem*, 1994 4(7), pp. 997-1016, Tokyo, Japan.

L. A. Parry-Jones et al. "Importance of Quadrupolar ordering in antiferroelectric liquid crystal devices", *Applied Physics Letters*, vol. 79, No. 13, Sep. 24, 2001, pp. 2097-2099, American Institute of Physics, Oxford, United Kingdom.

Tiezheng Qian et al. "Field-induced phase transitions in antiferroelectric liquid crystal", Physical Review E. vol. 60, No. 3, Sep. 1999, pp. 2978-2984, The American Physical Society, Cleveland, Ohio.

Jian-Feng Li et al. "Reversible propagating fingers in an antiferroelectric liquid crystals", Physical Review B, vol. 52, No. 18, Nov. 1, 1995, pp. R 13 075-R 13 078, The American Physical Society, Cleveland, Ohio.

(Continued)

*Primary Examiner* — Uyen-Chau N Le
*Assistant Examiner* — Hoang Tran
(74) *Attorney, Agent, or Firm* — Buchanan Ingersoll & Rooney PC (57) ABSTRACT

An electro-optic device including a liquid crystal material is disclosed, comprising antiferroelectric liquid crystals with large molecular tilt θ of about 45° degrees, disposed between two flat glass or polymer substrates. The liquid crystal molecules are preferably oriented parallel to the substrates (so-called HAF texture). The device is e.g. placed between two crossed polarizers so that in field-off conditions the impinging light is not passing through the device due to the isotropic optical properties of the antiferreoelectric liquid crystal aligned in HAF texture. An applied electric field induces a continuous transition of the optically isotropic antiferreoelectric (AF) state to ferroelectric (F) one which is birefringent enabling the transmission of light. The field-induced continuous switching between the optically isotropic antiferreoelectric state and the birefringent ferroelectric state enables the generation and fast switching of high contrast as well as generation of grey scale levels.

30 Claims, 6 Drawing Sheets

OTHER PUBLICATIONS

Arnout De Meyere et al. "Grating Diffraction in (Anti-)Ferroelectric Liquid Crystal Displays", *Ferroelectrics* 1996, vol. 181, pp. 1-10, Gent, Belgium.

W. K. Robinson et al. "Preliminary communication Bi-mesogenic organosiloxane liquid crystal materials exhibiting antiferroelectric phases", Liquid Crystals, 1997, vol. 23, No. 2, pp. 309-312, Southampton, United Kingdom.

Nils Olsson et al. "A new series of siloxane liquid crystalline dimers exhibiting the antiferroelectric phase", Liquid Crystals, vol. 32. No. 9, Sep. 2005, pp. 1139-1150, Göteburg, Sweden.

Pivnenko, M.N., et al., "Optical and electro-optical properties of bimesogenic organosiloxane antiferroelectric liquid crystals with molecular tilt approaching 45 degrees," *Liquid Crystals*, Feb. 2005, pp. 173-181, vol. 32, No. 2.

Olsson, N. et al., "Antiferroelectric siloxane liquid crystal dimmers with large molecular tilt under an applied electric field," *Liquid Crystals*, Sep. 2005, pp. 1125-1138, vol. 32, No. 9.

P. Rudquist et al., "Metastable Synclinic States in Orthoconic AFLC Cells and Optic Axis Dispersion in the Synclinic State" *Appl. Phys. Lett.* vol. 76 pp. 3528-3530 (2000) Abstract only.

P. Rudquist et al., "Tilt Plane Orientation in Antiferroelectric Liquid Crystal Cells and the Origin of the Pretransitional Effect" *Physical Review E* vol. 66, pp. 061708-1-061708-10 (2002) The American Physical Society.

Sven Lagerwall et al., "Unique Electro-Optical Properties of Liquid Crystals Designed for Molecular Optics" *Adv. Funct. Mater*. vol. 11, No. 2, pp. 87-94 (2001) Wiley-VCH Verlag GmbH.

Koen D'havé et al., "Solution of the Dark State Problem in Antiferroelectric Liquid Crystal Displays", *Applied Physics Letters*, vol. 76, No. 24, pp. 3528-3530 (2000) American Institute of Physics.

\* cited by examiner

LIQUID CRYSTAL DEVICE FOR GENERATION AND FAST SWITCHING OF HIGH CONTRAST IMAGES

The benefit is claimed under 35 U.S.C. §119(e) of U.S. Provisional Application No. 60/840,014 filed Aug. 25, 2006.

TECHNICAL FIELD

The present invention relates to a liquid crystal display device with grey scale capability generating wide viewing angle images with short switching times enabling the display of high contrast moving images.

STATE OF ART

In general, nematic liquid crystal displays (LCD) are operating on the basis of the dielectric coupling, i.e. the coupling between dielectric anisotropy ($\Delta\epsilon$) of the liquid crystal and an applied electric filed which give rise to an electro-optic response. This response is quadratic with the applied field and arises from the switching of the liquid crystal molecules by the field in non-polar fashion. Whereas the rise $\tau_r$, depends on the applied electric field, and thus it can be controlled by the field, the fall $\tau_f$ time does not, since it depends on the elastic restoring forces. At moderate electric field, the total switching time $\tau$, which is the sum of $\tau_r$ and $\tau_f$, is usually in the range of 10-20 ms, thus being not short enough for displaying moving images.

Moreover, it is also difficult to achieve a perfect dark state in the conventional nematic LCDs due to lack of perfect alignment or not correctly optimized device parameters.

Today efforts among the display engineers are focused on display concepts and materials giving shorter response times (below 1 ms), grey scale capability, high contrast, low energy consumption, easy processing and manufacture.

The ferroelectric liquid crystals (FLCs) belong to the class of tilted smectics in which the molecules are oriented at a fixed angle $\theta$ (tilt angle) with respect to the smectic layer normal which has the same sign in each smectic layer (synclinic order). FLC materials optically behave as materials with low biaxiality with effective optic axis tilted at angle $\theta$ with respect to the smectic layer normal. Their constituent molecules are chiral and if the helical molecular order in FLC, due to the molecular chirality, is suppressed by the solid surface of the confining substrates, for instance, then the FLC exhibits spontaneous polarization $P_s$. The later is sterically connected to the liquid crystal molecules so that by alternating the polarity of an electric field applied along the smectic layers the direction of $P_s$ could be switched which in turn will result in switching of the position of the liquid crystal molecules around a cone. Switching of the FLC molecules is polar and fast, with switching times in the microsecond region, and takes place in a plane perpendicular to the direction of the applied field, i.e. parallel to the electrodes (in-plane switching).

Antiferroelectric liquid crystals (AFLCs) belong to the general class of tilted chiral smectic liquid crystals in which the molecular tilt angle in the adjacent smectic layers has opposite sign (anticlinic order). In the majority of AFLCs, the molecular tilt is in the range 20-30 degrees. As a result of the anticlinic molecular order, the AFLCs do not exhibit a spontaneous polarization and, after suppressing of the molecular helical order, behave optically as biaxial materials whose projection of the principal optical plane (effective optic axis) is parallel to the smectic layer normal. In general, an electric field of certain strength (threshold voltage $V_{th}$) applied along the smectic layers will induce a transition from antiferroelectric (AF) state (with anticlinic molecular order and zero $P_s$) to ferroelectric (F) ones (with sinclinic molecular order and non-zero $P_s$) resulting thus switching of the effective optic from position parallel to position tilted at angle $\theta$ with respect to the smectic layer normal. Hence, the field-induced AF to F transition gives rise to an efficient optical response due to the substantial deviation of the effective optic axis position induced by the electric field. Likewise in FLCs the switching of the effective optic axis in AFLCs is also an in-plane switching. This switching process in most of the AFLC materials is usually in the microsecond range. The field-induced AF-F transition can be of first or of second order /1,2/. A specific feature of the first order (discontinuous) field-induced AF-F transition is the generation of quasi-one-dimensional finger-like solitary waves propagating along the smectic layers taking place when the applied field is exceeding a certain threshold field strength. There exist also AFLC materials exhibiting AF-F transition of second order (continuous) /3/.

Since their discovery AFLCs have been considered to be very promising materials for displays. Compared with FLC, AFLC can be aligned more easily and their electronic driving is simpler since it does not require d.c. compensation. In both AFLC and FLC displays, however, the dark field-off state suffers significantly from local misalignment of the liquid crystal molecules, usually caused by the preparation process and/or by the electronic driving of the displays.

Recently, AFLC materials with large molecular tilt in the range of $40°\leq\theta\leq55°$ degrees have been reported /4-6/. The general property of these materials, as theoretically predicted by Meyere et al /7/, is that they are optically isotropic, i.e. exhibit zero birefringence ($\Delta n=0$), when their molecular tilt $\theta$ is exactly 45 degrees, their helical molecular order is suppressed and the smectic layers are oriented perpendicular to the confining substrates (bookshelf geometry) with molecules lying parallel to the substrate plane (the so-called horizontal AF (HAF) state). AFLC materials possessing such a large molecular tilt and aligned in HAF texture enable the generation of high contrast images since the dark field-off state of the AFLC device depends only on the polarizers' quality but not on the local misalignment of the AFLC molecules as long as the HAF texture is preserved. The molecular tilt of AFLC materials may have values in the interval $40°\leq\theta\leq50°$ providing one of the necessary conditions for generation of a high level dark state. However, in all known AFLC materials with such large molecular tilt, the field-induced AF-F transition is of first order which result in a slow relaxation process from F to AF state in field-off state which in some cases may take many hours precluding thus the generation of high contrast moving images by these materials. Therefore, even though it is desirable to use AFLC materials with molecular tilt in the range of $40°\leq\theta\leq50°$, there is a problem how to enable a fast switching and fast relaxation process, in order to be able to use such materials for displaying of moving images. Moreover, there is also a need for such AFLC materials with grey scale capability.

SUMMARY OF THE INVENTION

The object of the present invention is to elevate the above mentioned problems and provide an improved liquid crystal device. In particular, an object of the invention is to provide a liquid crystal device having the capability of generating and fast switching of high contrast images.

The invention is not related to displays only but may be useful in many other liquid crystal devices as well.

According to a first aspect of the invention, there is provided a liquid crystal device comprising two substrates confining there between an antiferroelectric liquid crystal (AFLC) material having a molecular tilt angle in the range of $40 \leq \theta \leq 50°$, wherein the AFLC material exhibits a field-induced antiferroelectric to ferroelectric transition (AF-to-F transition) of second order during application of an electric field.

The AFLC material preferably exhibits a transformation from an AF-to-F transition of first order to an AF-to-F transition of second order upon lowering the temperature, said second order transition occurring at a temperature below the transformation temperature (Ttr).

Further, the AFLC material preferably satisfies the following Equation I:

$$J < U \qquad (I)$$

wherein J is the free energy barrier between antiferroelectric state and ferroelectric state and U is the coupling coefficient that favors the antiferroelectric state.

Still further, the AFLC material preferably also satisfies the following Equation II:

$$J < \frac{U}{5} \qquad (II)$$

In addition, the AFLC material preferably also satisfies the following Equation III:

$$J < \frac{U}{10} \qquad (III)$$

The AFLC material also preferably exhibits $J \leq kT$, where k is the Boltzmann constant and T is the temperature.

Further, the AF-to-F transition preferably has a lower threshold, providing a continuous transition under application of an electric field.

The AFLC material advantageously comprises smectic layers aligned substantially perpendicular to the confining substrates, a molecular helical order being suppressed by surface interactions with the confining substrates, and a molecular tilt plane, containing the AFLC molecules and the smectic layers' normal, substantially parallel to the confining substrates.

In a preferred embodiment, the AFLC material comprises bimesogenic, dimeric siloxane molecules.

Further, it is preferred that the AFLC material comprises at least one molecule represented by Formula I:

wherein $m \geq 6$, said molecule being designated di(4PPBm) 3Si. Here, m is preferably within the range from 6 to 18, and most preferably exactly 6. It is also preferred that the AFLC material comprises at least one molecule of Formula I having $m \geq 6$, such as 6 or 11, and at least one molecule of Formula I having $m < 6$, such as 3, 4 or 5.

Further, each of said substrates further preferably comprises patterned electrodes facing the AFLC material for generating an electric field essentially perpendicular to the substrates. Preferably, at least one of said substrates further comprises an alignment layer covering said electrodes.

In a preferred embodiment, at least one of the substrates of the liquid crystal device is transparent. It is also preferred that the liquid crystal device is an electro-optic device, and most preferably a display device providing fast switching in the microsecond range of high contrast images.

According to another aspect of the invention, there is provided a liquid crystal device which comprises: a pair of substrates forming a micron sized cavity, a liquid crystal bulk layer arranged in between said substrates. The substrates and the liquid crystal bulk layer forms a sandwiched cell. At least one of the substrates, which can be glass or plastic, is transparent. The liquid crystal bulk is antiferroelectric liquid crystal material with high molecular tilt preferably in the range of $40° \leq \theta \leq 50°$ degrees exhibiting a continuous (second order) field-induced AF-F transition. The sandwich cell preferably includes first and second electrodes deposited onto the inner substrates surface of the cell substrates for generating an electric field across the cell that enables the switching of the liquid crystal. Onto the top of the inner substrates surface of at least one of the substrates is preferably deposited alignment layer for promoting the formation of horizontal antiferroelectric (HAF) texture. Further, the device is preferably inserted between two crossed polarizers for converting the field-induced switching of the device optic axis in visible optical response.

It is preferable that the pitch of the antiferroelectric liquid crystal material is long enough to be completely unwound by the action of the substrate surface and thus enable the formation of the HAF texture.

According to still another aspect of the invention, there is provided an electro-optic device including a liquid crystal material is disclosed, comprising antiferroelectric liquid crystals with large molecular tilt θ of about 45° degrees, disposed between two flat glass or polymer substrates having electrode pattern on their inner surfaces facing the liquid crystal. The substrates have preferably been pre-coated with alignment layer for aligning the liquid crystal uniformly with the smectic layers lying essentially perpendicular to the con- (I)

fining substrates in which the liquid crystal molecules are oriented parallel to the substrates (so-called HAF texture). The device is preferably placed between two crossed polarizers so that in field-off conditions the impinging light is not passing through the device due to the isotropic optical properties of the antiferreoelectric liquid crystal aligned in HAF texture. An applied electric field induces a continuous transition of the optically isotropic antiferreoelectric (AF) state to ferroelectric (F) one which is birefringent enabling the transmission of light. The field-induced continuous switching between the optically isotropic antiferreoelectric state and the birefringent ferroelectric state enables the generation and fast switching of high contrast as well as generation of grey scale levels.

Other features and advantages of the present invention will become apparent from the following detailed description of the invention.

BRIEF DESCRIPTION OF DRAWINGS

For exemplary purpose, the invention will now be discussed in more detail by means of specific embodiments, and with reference to the drawings, on which.

DETAILED DESCRIPTION OF THE INVENTION

A liquid crystal device according to a preferred embodiment of the present invention comprises:
 two confining substrates, such as glass or plastic substrates,
 a liquid crystal bulk layer confined in between said substrates,
 an electrode pattern applied on the inner surface of the substrates,
 an optional alignment layer arranged to interact with the bulk liquid crystal layer deposited on the inner surface of at least one of the substrates.

The cell gap is filled with bulk liquid crystal layer. In this first group of embodiments of the invention the bulk liquid crystal layer is AFLC material with molecular tilt in the range of $40°\leq\theta\leq50°$. Preferably, the helical pitch of the AFLC material is long enough to enable unwinding of the helical molecular order by the surfaces of the confining substrates and thus providing the necessary conditions for formation of the HAF texture. It is also advantageous for the achievement of fast field-induced switching of AF state to F state that the induced F state posses large $P_s$. It should be noted that alignment in HAF texture of AFLC material with such a large molecular tilt as in the interval of $40°\leq\theta\leq50$ is a preferred condition for achievement of optimal dark state in absence of applied electric field, and is consequently advantageous for generation of high contrast images. However, the HAF texture of said AFLC materials with molecular tilt in the range of $43°\leq\theta\leq47°$ may not be solely sufficient for the generation and fast switching of high contrast images. There is another condition that the AFLC materials should preferably meet as well.

Figure 3:
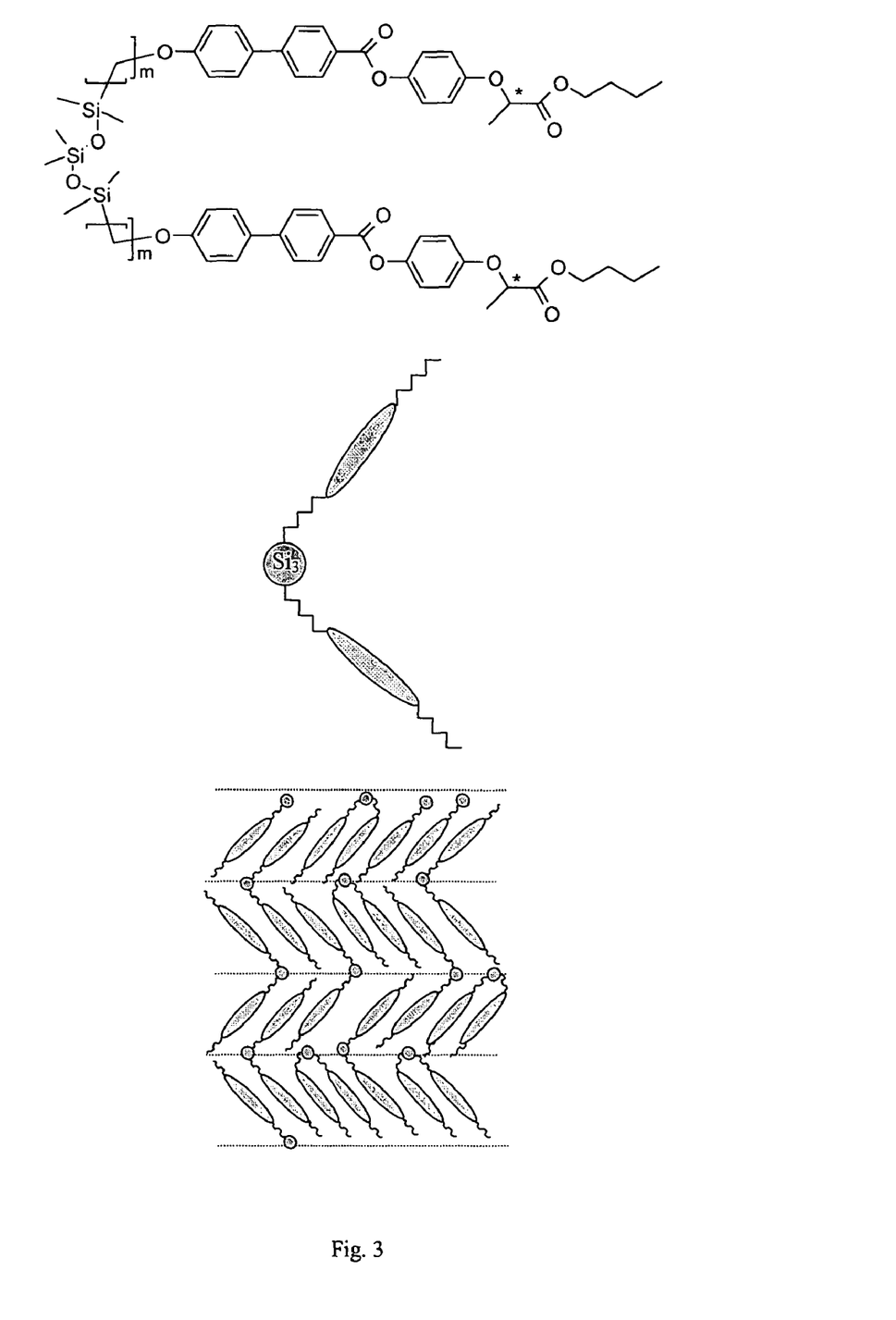
FIG. 3 is the molecular structure of the AFLC material used in a device according to an embodiment of the invention, and a schematic presentation of the arrangement of the siloxane AFLC bi-mesogenic molecules.

According to the invention, in this first group of embodiments said AFLC belongs to the group of siloxane AFLC bi-mesogens possessing a large molecular tilt close to 45° comprising dimeric molecules preferably with a structure presented schematically in FIG. 3. The field-induce AF-F transition in these AFLC materials is of second order, i.e. continuous, and thus being not anymore accompanied by generation of finger like domains propagating along the smectic layers, a process that slows substantially down the relaxation process speed.

Figure 4:
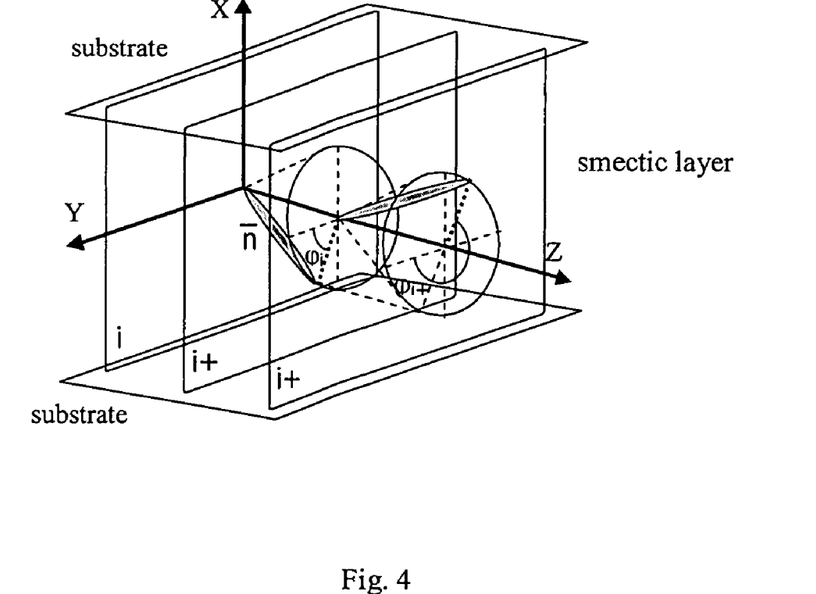
FIG. 4 presents the geometry used in the theoretical model of an AFLC aligned in HAF. $\phi_i$ is the azimuthal angle that the projection of the director n onto the XY plane (the smectic layer plane) makes with the Y axis.

According to the theoretical model of Qian and Taylor /1/, the free energy of AFLC layer, with thickness d and suppressed molecular helical order, reads [c.f. FIG. 4]:

$$F = d \sum_i \int f_i \, dx \, dy, \qquad /1/$$

$f_i$ is the free energy of the $i^{th}$ smectic layer given by:

$$f_i = \frac{1}{2} K \sin^2 \Theta \left[ \left( \frac{\partial \varphi_i}{\partial x} \right)^2 + \left( \frac{\partial \varphi_i}{\partial y} \right)^2 \right] - \qquad /2/$$

$$P_o E \cos \varphi_i + U \cos(\varphi_{i+1} - \varphi_i) - \frac{J}{2} \cos[2(\varphi_{i+1} - \varphi_i)]$$

$\theta$ is the molecular tilt. $\phi_i$ is the azimuthal angle that the projection of the director n onto the XY plane (the smectic layer plane) makes with the Y axis [c.f. FIG. 4]. In the undistorted AF state the azimuthal angles in two adjacent layers obey the condition $\Delta\phi=\phi_{i+1}-\phi_i=\pi$. $P_o$ is the polarization within the i-layer lying perpendicular to the molecular tilt plane. K is an average elastic constant. The third and fourth terms in the eq. 2 represent the dipolar and quadrupolar interlayer interactions, respectively. These interactions determine whether the liquid crystal molecules will have synclinic or anticlinic order. It should be noted that in the case of siloxanes dimers, the siloxane group connecting two symmetric mesogenic molecules in a dimeric structure plays a vital role in the appearance of an anticlinic molecular order of the mesogens /4/. The coefficient U in eq. 2 represents the coupling coefficient that favours the anticlinic order while the coefficient J represents the energy barrier between anticlinic and synclinic order. Whether the AF-F transition will be of first or second order depends on the relative height of the free energy barrier separating F and AF states, represented by the coefficient J, as well as on the ratio J/U /1,2/. High J results in a field-induced AF-F transition of first order manifested by generation and propagation of quasi-one-dimensional finger like solitary-waves along the smectic layers /8/. On the contrary, a low energy barrier $J (J \leq kT$, where k is the Boltzmann constant and T is the temperature) results in an AF-F transition of a second order, which is a continuous transition from AF to F ordering, i.e. a thresholdless AF-F transition /3/. According to the model suggested by of Qian and Taylor /1/, if J is larger than U/10 the AF-F transition is of first order while if it is smaller then the transition becomes continuous, i.e. of second order. A characteristic feature of the field-induced AF-F transition of first order is the present of threshold voltage for the transition which reflects the abrupt changes in the molecular order. The electro-optic response arising from this transition exhibits a distinct hysteresis /2/. In the case of field-induced AF-F transition of second order the changes in the molecular order are continuous and therefore the transition appears as thresholdless and the electro-optic response is with V-shape, i.e. has no hysteresis /2,3/.

In a second group of embodiments, an electric field is generated by an electrode pattern formed on the inner surface of the substrates. Preferably, the electric field is applied across the cell gap.

A desired initial alignment in absence of an applied electric field is generally achieved by appropriate surface treatment of the confining substrates, such as by depositing so-called alignment layer onto the confining substrates surface facing said the liquid crystal bulk layer. The initial liquid crystal alignment is defined by the solid surface/liquid crystal interactions. The orientation of the liquid crystal molecules adjacent the confining solid surface is transferred to the liquid crystal molecules in the bulk via elastic forces, thus imposing essentially the same alignment to all liquid crystal bulk molecules. In a third group of embodiments, said alignment layer is deposited onto the inner substrate surface of at least one of the substrates for promoting the formation of HAF texture in which the helical molecular order is suppressed.

The invention will now be further illustrated by means of the following non-limiting example.

EXEMPLARY EMBODIMENT

Figure 1:
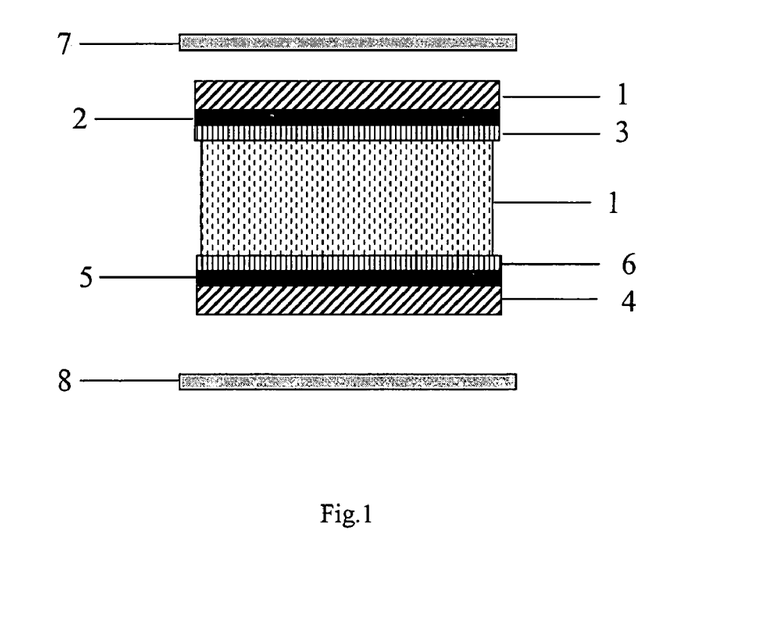
FIG. 1 is a cross section of the device according to an embodiment of the invention.
Figure 2:
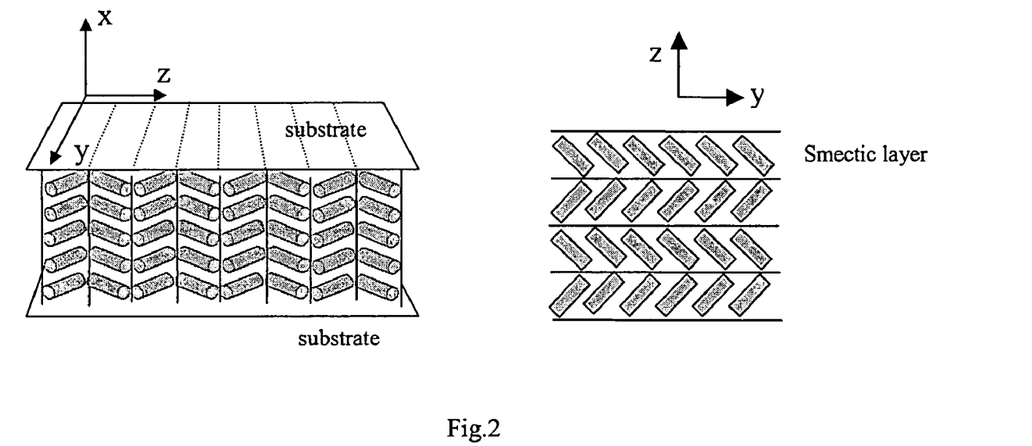
FIG. 2 is a schematic view of a device in which, according to an embodiment of the invention, the AFLC material is aligned in horizontal antiferroelectric (HAF) state. The molecular helical order in this state is suppressed and the AFLC material is aligned in bookshelf geometry with the molecular tilt plane parallel to the substrates.
Figure 5:
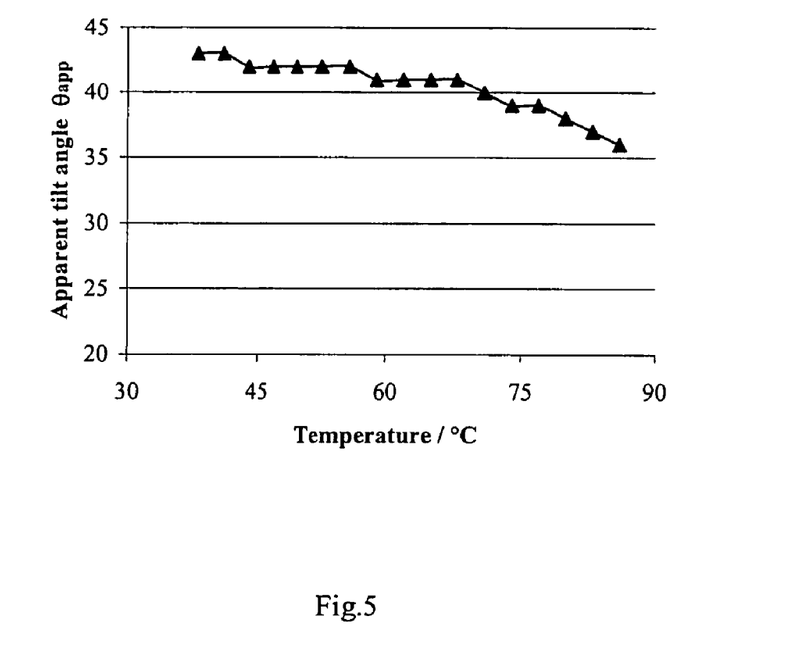
FIG. 5 illustrates the behavior of the apparent tilt of the effective optic axis as a function of the temperature.
Figure 6:
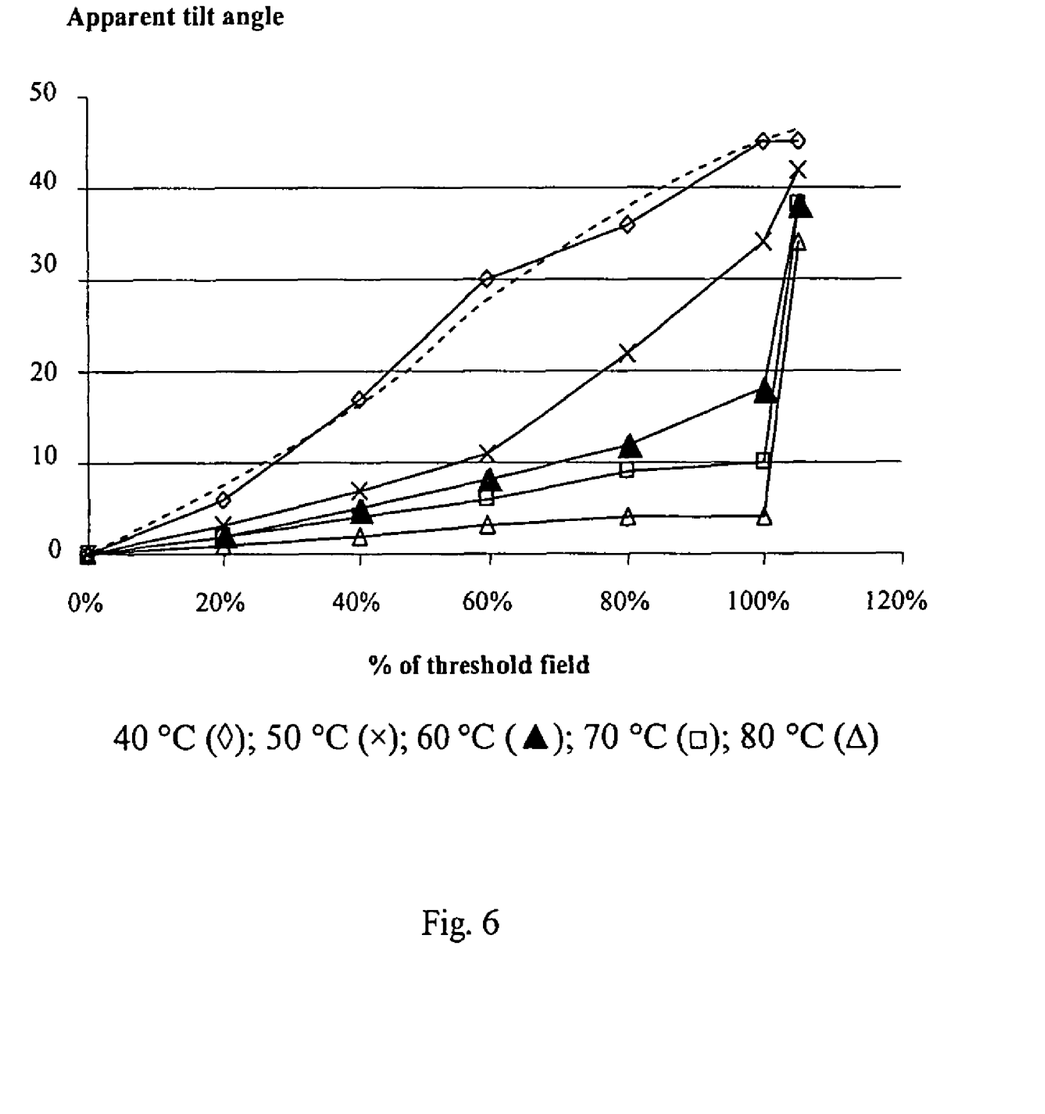
FIG. 6 illustrates the behavior of the apparent tilt of the effective optic axis as a function of the applied electric field.
Figure 7:
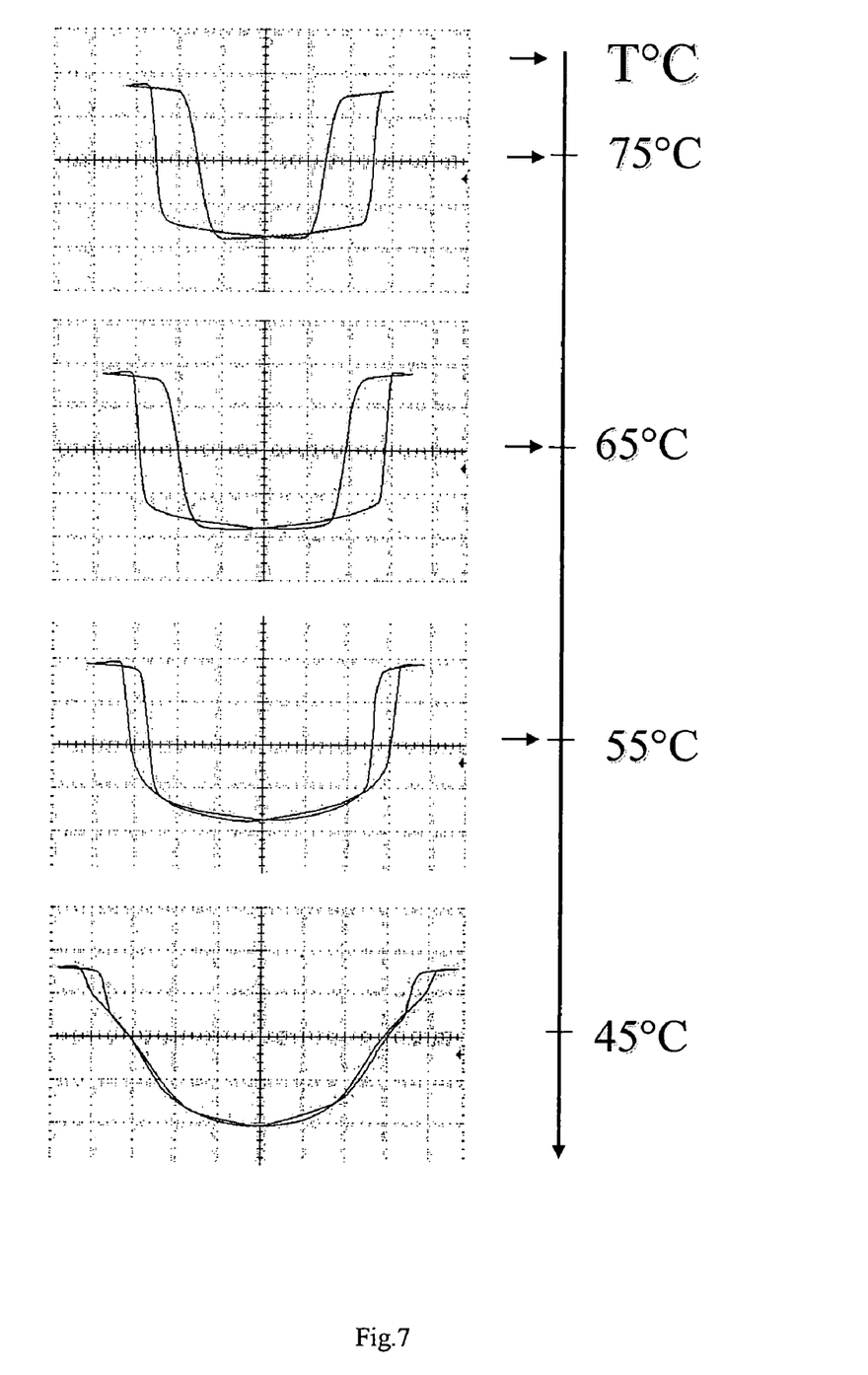
FIG. 7 presents the electro-optical response of the device as a function of the temperature.
Figure 8:
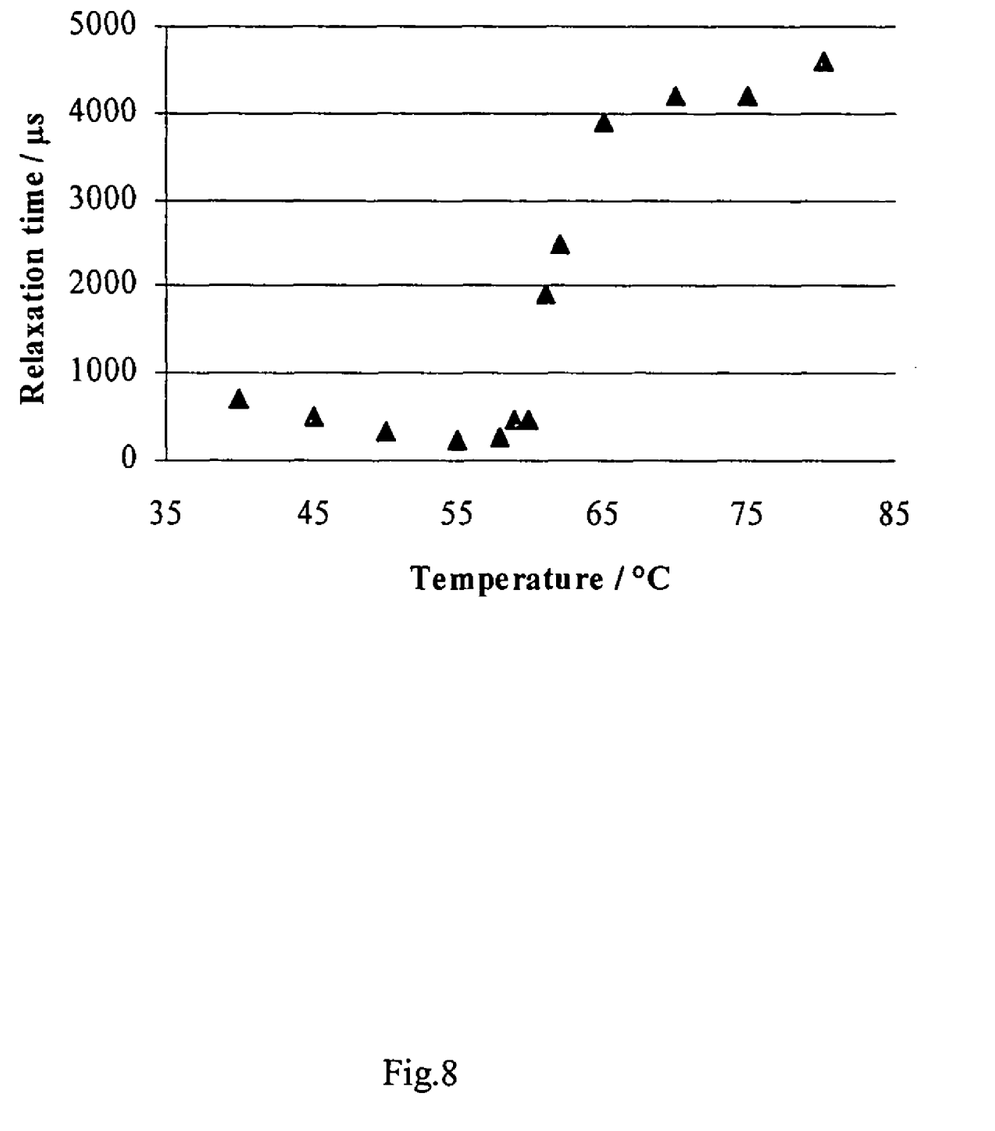
FIG. 8 presents the relaxation time of the F-AF transition as a function of the temperature.

The device consist of two solid substrates 1 and 4 with inner surfaces covered subsequently by transparent electrodes 2 and 5 on top of which are deposited alignment layers 3 and 6 (c.f. FIG. 1). The device is inserted between two crossed polarizers 7 and 8. The gap between the substrates, which is about 2 µm, is filled by siloxane AFLC dimer designated as di(4PPB6)3Si with structure as the one depicted on FIG. 3 with m=6. The siloxane AFLC dimer is aligned in HAF texture depicted on FIG. 2. This dimer has a broad antiferroelectric (SmC$_A$) phase in the temperature interval 17-90° C. with an apparent molecular tilt, measured in the field-induced F state /6/, varying in the range of 36-43 degrees (see FIG. 5). A peculiar feature of di(4PPB6)3Si is that at high temperatures the field-induced AF-F state is of first order. Upon lowering the temperature, however, the AF-F transition changes continuously its character from first to second order. This transformation started at temperature $T_{tr} \approx 60°$ C. and was completed within a temperature interval of about 15 degrees. At temperatures above $T_{tr}$, depending also on the substrate surface quality, finger-like solitary waves of AF-state invading the field-induced F-state, typical for first order AF-F transition, were detected in the sample during the relaxation process. The latter was in the millisecond range and lasted until the field-free F-AF transition was completed. However, at temperatures below $T_{tr}$, the AF-F transition of this compound did not exhibit such textural changes. Below $T_{tr}$, the field-induced F state in the sample emerged in the AF phase in an increasingly continuous way with decreasing temperature, typical behaviour for AF-F transition of second order. The relaxation from F to AF state at zero-field occurred in the same fashion. This peculiar behaviour is depicted on FIG. 6 and FIG. 7. As seen from FIG. 6, the apparent tilt angle above $T_{tr}$ abruptly changes at certain threshold voltage whereas bellow this temperature it continuously increases with the applied voltage. Moreover, the optical response for temperatures above $T_{tr}$ has hystheresis whereas for temperatures bellow $T_{tr}$ the response is with mixed UN-shape, i.e. has no hysteresis (c.f. FIG. 7). The advantage to have second order instead of first order field-induced AF-F transition is demonstrated clearly on FIG. 8. As can be seen the response time in the temperature region in which di(4PPB6)3Si exhibits second order field-induced AF-F transition the response time for this transition is more than one order shorter than the response time detected at higher temperatures where AF-F transition is of first order.

Specific embodiments of the invention have now been described. However, several alternatives are possible, as would be apparent for someone skilled in the art. For example, the liquid crystal device may comprise additional layers, as is per se known in the art. Further, the substrates may be transparent or non-transparent, and of many different materials. Still further, the electrodes and polarizers may be embodied in many different ways. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. The word "comprising" does not exclude the presence of other elements or steps than those listed in the claim. The word "a" or "an" preceding an element does not exclude the presence of a plurality of such elements. Further, a single unit may perform the functions of several means recited in the claims.

REFERENCES

1. T. Qian and P. L. Taylor, Phys. Rev. E, 60, 2978 (1999).
2. L. A. Parry-Jones, and S. J. Elston, Appl. Phys. Lett,. 79, 2097 (2001).
3. A. Fukuda, Y. Takanishi, T. Isozaki, K. Ishikawa, H. Takezoe, J. Mater. Chem., 4, 997 (1994).
4. W. K. Robinson, P. S. Kloess, C. Carboni and H. J. Coles, Liq. Cryst. 23, 309 (1997).
5. K. D'Havé, A. Dahlgren, P. Rudquist, J. P. F Lagerwall, G. Andersson, M. Matuszczyk, S. T. Lagerwall, R. Dabrowski, and W. Drzewinski, Ferroelectrics, 244, 115 (2000).
6. N. Olsson, B. Helgee, G. Andersson, and L. Komitov, Liq. Cryst., 32, 1139 (2005).
7. A. De Meyere, J. Formier, and H. Pauwels, H., Ferroelectrics, 181, 1 (1996).
8. J.-F. Li, X.-Y, Wang, E. Kangas, P. L. Taylor, C. Rosenblatt, Y, -I. Suzuki, and P. E. Cladis, Phys. Rev. B, 52, R13075 (1995).

What is claimed is:

1. A liquid crystal device comprising two substrates confining there between an antiferroelectric liquid crystal (AFLC) material having a molecular tilt angle in the range of $40° \leq \theta \leq 50°$, wherein the AFLC material exhibits a field-induced antiferroelectric to ferroelectric transition (AF-to-F transition) of second order during application of an electric field.

2. A liquid crystal device as claimed in claim 1, wherein said AFLC material exhibits a transformation from an AF-to-F transition of first order to an AF-to-F transition of second order upon lowering the temperature, said second order transition occurring at a temperature below the transformation temperature ($T_{tr}$).

3. A liquid crystal device as claimed in claim 1, wherein the AFLC material is satisfying Equation I $$J < U \quad (I)$$

wherein J is the free energy barrier between antiferroelectric state and ferroelectric state and U is the coupling coefficient that favors the antiferroelectric state.

4. A liquid crystal device as claimed in claim 3, wherein the AFLC material is satisfying Equation II $$J < \frac{U}{5} \quad (II)$$

5. A liquid crystal device as claimed in claim 4, wherein the AFLC material is satisfying Equation III $$J < \frac{U}{10} \quad (III)$$

6. A liquid crystal device as claimed in claim 3, wherein the AFLC material exhibits $J \leq kT$, where k is the Boltzmann constant and T is the temperature.

7. A liquid crystal device as claimed in claim 1, wherein said AF-to-F transition is threshold less providing a continuous transition under application of an electric field.

8. A liquid crystal device as claimed in claim 1, wherein the AFLC material comprises smectic layers aligned substantially perpendicular to the confining substrates, a molecular helical order being suppressed by surface interactions with the confining substrates, and a molecular tilt plane, containing the AFLC molecules and the smectic layers' normal, substantially parallel to the confining substrates.

9. A liquid crystal device as claimed in claim 1, wherein the AFLC material comprises bimesogenic, dimeric siloxane molecules.

10. A liquid crystal device as claimed in claim 1, wherein the AFLC material comprises at least one molecule represented by Formula I wherein $m \geq 6$, said molecule being designated di(4PPB$_m$)3Si.

11. A liquid crystal device as claimed in claim 10, wherein m is within the range from 6 to 18.

12. A liquid crystal device as claimed in claim 10, wherein m is 6.

13. A liquid crystal device as claimed in claim 10, wherein the AFLC material comprises at least one molecule of Formula I having $m \geq 6$, and at least one molecule of Formula I having m<6.

14. A liquid crystal device as claimed in claim 13, wherein the at least one molecule of Formula I having $m \geq 6$ has an m selected from the group consisting of 6 and 11.

15. A liquid crystal device as claimed in claim 13, wherein the at least one molecule of Formula I having m<6 has an m selected from the group consisting of 3, 4 and 5.

16. A liquid crystal device as claimed in claim 1, wherein each of said substrates further comprises patterned electrodes facing the AFLC material for generating an electric field essentially perpendicular to the substrates.

17. A liquid crystal device as claimed in claim 16, wherein at least one of said substrates further comprises an alignment layer covering said electrodes.

18. A liquid crystal device as claimed in claim 1, wherein at least one of said substrates is transparent.

19. A liquid crystal device as claimed in claim 1, wherein the device is an electro-optic device.

20. A liquid crystal device as claimed in claim 19, wherein the device is a display device providing fast switching in the microsecond range of high contrast images.

21. A liquid crystal device comprising a sandwich cell with a pair of substrates forming a cavity there between and a liquid crystal bulk layer arranged in between said substrates in said cavity, wherein at least one of the substrates is transparent, and wherein the liquid crystal bulk is antiferroelectric liquid crystal (AFLC) material with high molecular tilt, exhibiting a continuous (second order) field-induced antiferroelectric to ferroelectric transition (AF-F) transition.

22. A liquid crystal device as claimed in claim 21, wherein the antiferroelectric liquid crystal (AFLC) material has a molecular tilt in the range of $40° \leq \theta \leq 50°$.

23. A liquid crystal device as claimed in claim 21, wherein the sandwich cell includes first and second electrodes deposited onto the inner substrates surface of the cell substrates for generating an electric field across the cell that enables the switching of the liquid crystal.

24. A liquid crystal device as claimed in claim 21, wherein the top of the inner substrates surface of at least one of the (I)

substrates comprises a deposited alignment layer for promoting the formation of horizontal antiferroelectric (HAF) texture.

25. A liquid crystal device as claimed in claim 21, wherein it further comprises two crossed polarizers arranged outside said sandwiched cell for converting the field-induced switching of the device optic axis into visible optical response.

26. A liquid crystal devices as claimed in claim 21, wherein the pitch of the antiferroelectric liquid crystal material is long enough to be completely unwound by the action of the substrate surface and thus enable the formation of the HAF texture.

27. An electro-optic device including: a liquid crystal material comprising antiferroelectric liquid crystals with large molecular tilt θ of about 45° degrees; tow flat substrates, wherein the liquid crystal material is disposed between the substrates, wherein the substrates have electrode pattern on their inner surfaces facing the liquid crystal wherein the liquid crystal molecules are oriented parallel to the substrates in a HAF texture; tow crossed polarizers, arranged so that in a field off condition impinging light is not passing through the device due to the isotropic optical properties of the antiferroelectric liquid crystal aligned in HAF texture, whereas an applied electric field induces a second order transition of the optically isotropic antiferroelectric (AF) state to a ferroelectric (F) state which is birefringent enabling the transmission of light wherein the field-induced continuous switching between the optically isotropic antiferroelectric state and the birefringent ferroelectric state enables the generation and fast switching of high contrast as well as generation of grey scale levels.

28. The electro-optic device of claim 27, wherein the liquid crystal molecules are oriented parallel to the substrates in a HAF texture by pre-coating of the substrates with alignment layer for aligning the liquid crystal uniformly with the smectic layers lying essentially perpendicular to the confining substrates.

29. A liquid crystal device as claimed in claim 4, wherein the AFLC material exhibits $J \leq kT$, where k is the Boltzmann constant and T is the temperature.

30. A liquid crystal device as claimed in claim 5, wherein the AFLC material exhibits $J \leq kT$, where k is the Boltzmann constant and T is the temperature.

* * * * *